Figure 1:
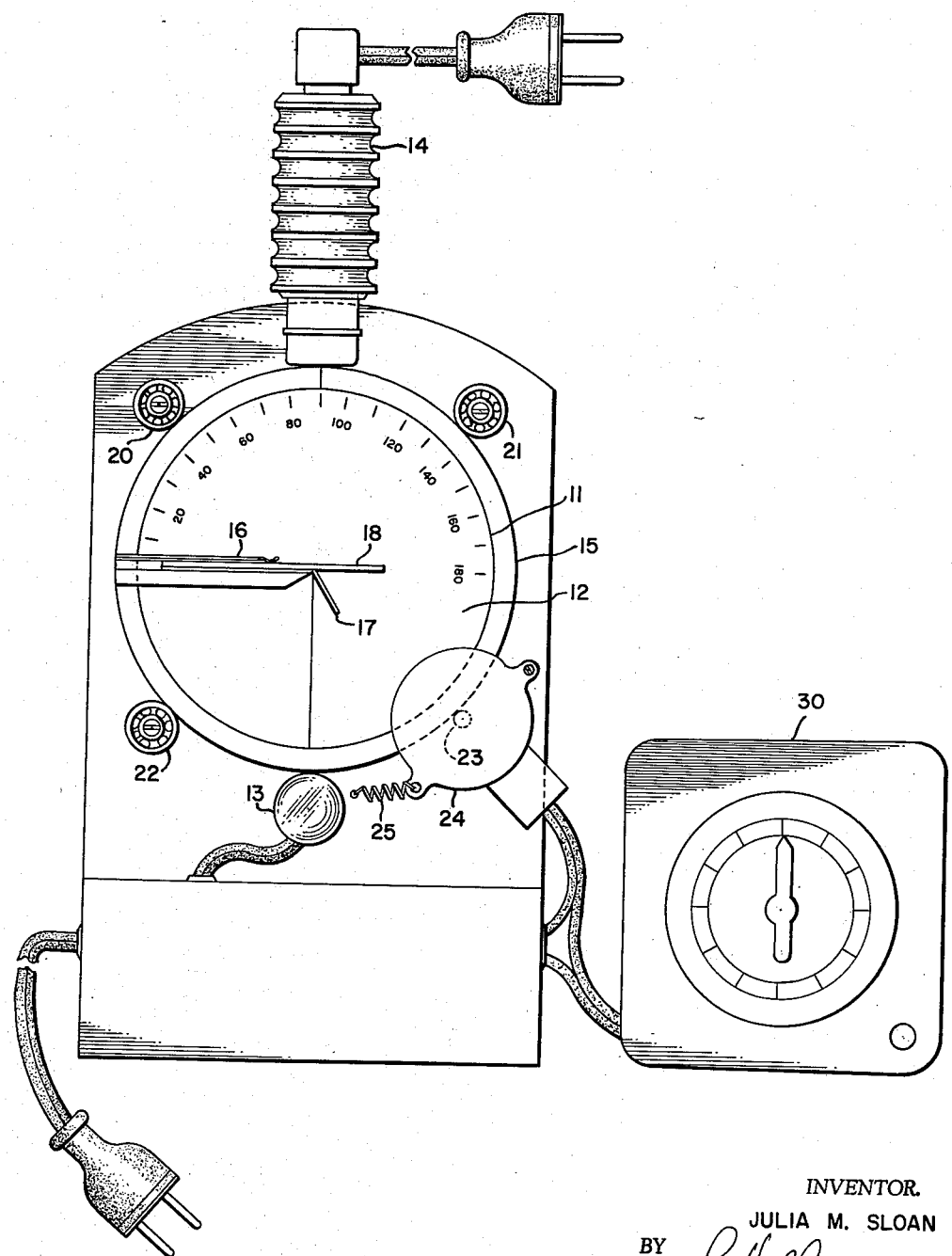

June 25, 1963  J. M. SLOAN ETAL  3,094,866
WRINKLE RECOVERY TEST APPARATUS
Filed April 28, 1961  2 Sheets-Sheet 1

INVENTOR.
JULIA M. SLOAN
BY
ATTORNEYS

June 25, 1963 J. M. SLOAN ETAL 3,094,866
WRINKLE RECOVERY TEST APPARATUS
Filed April 28, 1961

INVENTOR.
JULIA M. SLOAN
BY
ATTORNEYS

United States Patent Office 3,094,866
Patented June 25, 1963

3,094,866
WRINKLE RECOVERY TEST APPARATUS
Julia M. Sloan, Heber W. Weller, Jr., and Chester H. Haydel, Metairie, La., assignors to the United States of America as represented by the Secretary of Agriculture
Filed Apr. 28, 1961, Ser. No. 106,414
1 Claim. (Cl. 73—159)
(Granted under Title 35, U.S. Code (1952), sec. 266)

A non-exclusive, irrevocable, royalty-free license in the invention herein described, throughout the world for all purposes of the United States Government, with the power to grant sublicenses for such purposes, is hereby granted to the Government of the United States of America.

This invention relates to an apparatus for measuring the inherent ability of a fabric to recover from mechanical deformation. More particularly this invention relates to an automated apparatus for measuring crease recovery angles.

Wash-wear fabrics now comprise a sizeable percentage of the textile market and the work of textile treatment evaluation in this field is becoming increasingly important. One criterion of value in wash-wear garments is the ability of the garment fabric to recovery spontaneously from a mechanical deformation such as creasing or wrinkling. The conventional laboratory test for evaluating this particular characteristic involves measuring of the so-called "crease recovery angle." The test consists of suspending a sample of fabric that has been creased under controlled conditions at the index of a vertically positioned protractor. The fabric sample is clamped firmly on one side of the crease and the remaining portion of the fabric sample beyond the crease is permitted to hang freely. The free hanging portion is kept aligned with the index or reference point on the protractor during spontaneous recovery from creasing. Alignment adjustments, according to a prescribed method, are made manually by the operator every 15 seconds during the first minute and at least once every 60 seconds thereafter until a total of five minutes has elapsed. The recovery of the fabric sample is then reported in degrees of angle. Empirical tests such as the measurement of crease recovery angles are meaningful only if precision of the test is high. Intermittent manual adjustment of the fabric sample and index alignment with each adjustment subject to operator error is plainly no match precisionwise for a continuous mechanical adjustment. For example, the inertia of the fabric itself is able to exert considerable influence on the crease recovery angle test results depending upon whether the operator corrects alignment of the sample and protractor index with a slow, smooth motion or a rapid abrupt motion. Obviously, a test monitored by a human operator requires close supervision and is time consuming. It has been estimated that a skilled technician can successfully monitor no more than six crease recovery angle tests on timed sequence schedule employing manually adjusted apparatus. More important, however, than the requirements of operator time and attention is the fact that manual adjustment of sample and index alignment adversely affects precision of the test.

It is the objective of this invention to provide an automatic mechanical apparatus for testing crease recovery angles, which apparatus, once placed in operation carries out the entire test on a single fabric sample without operator attention. A photoelectric cell with conventional circuitry wired in "off/on" switching relationship to an electric drive means monitors the test apparatus. The drive means when actuated by the photoelectric cell operates to alter the angular relationship of the index portion and the graduated portion of a device for measuring angular displacement (a protractor). Continuous alignment of the fabric sample with respect to the point of reference on the angle measuring device is thus achieved throughout the spontaneous recovery of the sample from an experimentally imposed crease.

Figure 3:
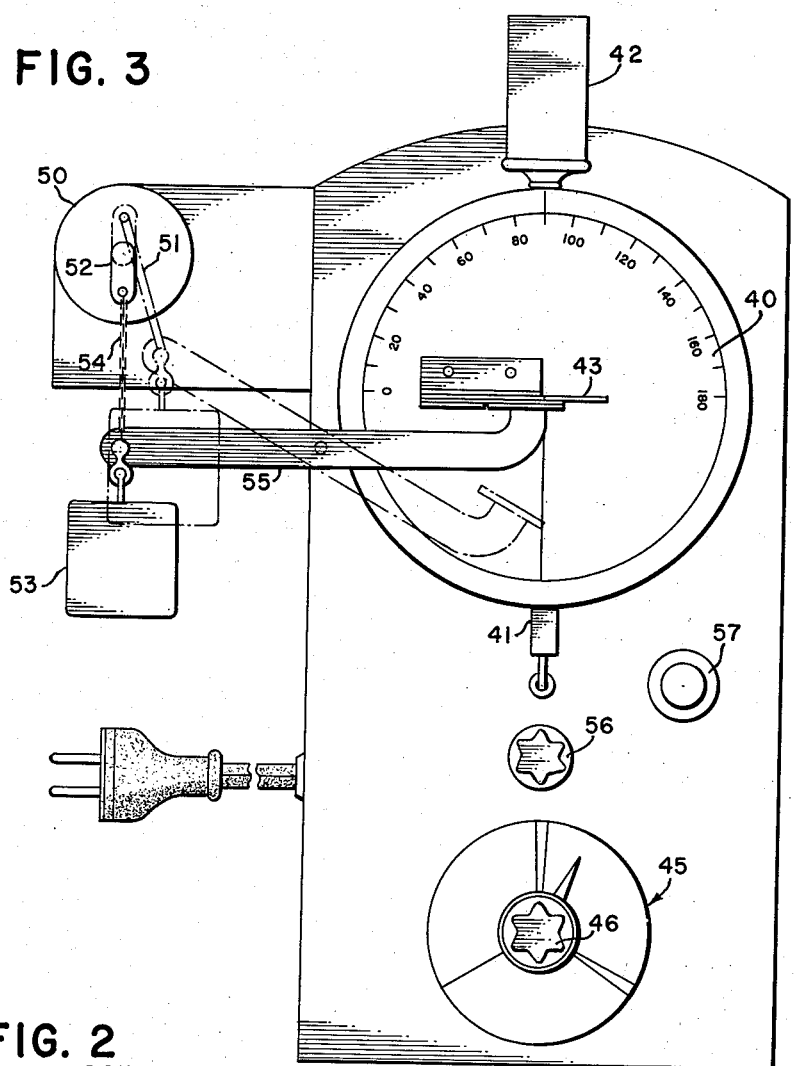
Figure 2:
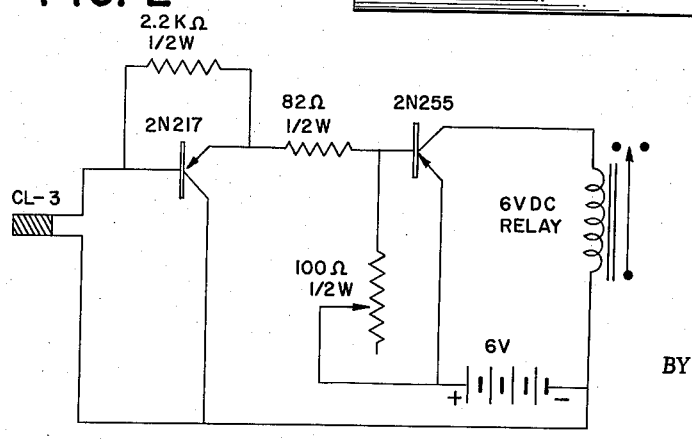

The inventive apparatus is described below, reference being made to the accompanying drawing wherein FIGURE 1 represents a schematic front elevation of one embodiment of the invention, FIGURE 2 illustrates an operable circuit diagram for the apparatus of FIGURE 1, and FIGURE 3 represents a schematic front elevation of a second embodiment.

Referring with more particularity to FIGURE 1, the apparatus depicted therein is provided with a circular protractor 11, mounted stationary in a vertical position, and having a face 12 calibrated to measure angular displacement in a single, vertical plane over a range of at least 180°, a range of from 0° to 180° being illustrated in the drawing. A photoelectric cell 13, having a cathode (not shown), and equipped with a conventional amplifier and relay circuit (not shown) is also included, being positioned below the protractor and having its cathode vertically aligned with the center point index thereof.

A light source 14, positioned above the protractor, is also provided for projecting a focused beam of light transverse to the calibrated face of the protractor in a path that crosses the center point index thereof, the beam being oriented at right angles to the 0°–180° base line of the protractor and aimed at the cathode of the photoelectric cell.

An electric switch (not shown) and accompanying circuitry is operatively associated with the photoelectric cell so that the switch is in open position at such time as the path of the focused beam of light from the light source is uninterrupted and is in closed position at such time as the path of the focused beam of light is interrupted.

In front of the calibrated portion of the protractor and mounted cencentrically therewith, is a transparent disc 15 of slightly larger diameter than the protractor. The disc 15 provides clamping means carrying an angle-indicating arm as, for example, spring clip clamp 16, for securely supporting in an angular position one end of a pre-creased, substantially rectilinear sample of textile fabric 17 in a transparent specimen holder 18. The clamping means and angle-indicating arm (spring clip clamp 16) are mounted for rotational movement across the calibrated face of the protractor with the axis of rotation coincident with the center point index of the protractor, the angle-indicating arm being aligned to traverse the calibrations on the face of the protractor when it is rotated. The clamping means, furthermore, is adapted to contact and hold the pre-creased fabric sample at a line immediately adjacent and parallel to the fabric crease but not superimposed thereon. The unsupported portion of the pre-creased fabric sample depends vertically away from the clamping contact adjacent and parallel to, but not interrupting, the path of the focused beam of light while the fabric is in position when initially creased, but is capable of interrupting the path of the focused beam of light at such time when the fabric sample inherently recovers from the pre-induced crease.

The transparent disc 15 is supported by three radial bearings 20, 21, and 22 and a friction drive wheel 23 (shown schematically in dotted). This wheel is part of electric motor drive means responsive to said electric switch and adapted to move the clamping means and angle-indicating arm about its axis of rotation. The wheel is mounted on the shaft (not shown) of electric motor 24, and drives the disc 15 in clockwise direction via frictional contact on the disc periphery. The motor is geared to rotate the disc 15 at the rate of approximately 1.0 revolution per minute. A coiled spring 25 attached to the motor applies tension to maintain the necessary frictional contact between the motor gear and the outer periphery of the disc 15. The coiled spring tension arrangement, in addition, serves as a slip clutch for setting of the disc back to starting position before beginning a test.

The inventive device also provides a program timer 30 having an automatic timing switch with contacts normally open but which are closed during the metering of time intervals in the circuit of the electric motor drive means. The automatic timing switch is adapted to stop the electric motor drive means at a preset time to terminate the test.

The protractor, photoelectric cell, light source, electric switch, clamping means, electric motor drive means, and program timer are so aligned that recovery from deformation of the creased fabric sample, as evidenced by lateral movement of its unsecured end, interrupts the focused beam of light between the light source and the cathode of the photoelectric cell, actuating the electric switch which, in turn, actuates the electric motor drive means to move the clamping means and angle-indicating arm about the axis of rotation to reposition the angle-indicating arm relative to the protractor calibrations, and to move the unsecured end of the creased fabric sample out of the focused beam of light thereby reestablishing the photoelectric cell circuit and opening the electric switch circuit to stop the electric motor drive means, this repetitive operation continuing with cumulative angular measurements of the inherent recovery of the creased fabric sample until termination of the test.

The apparatus is operated as follows: a precreased sample of fabric is placed under the spring clip clamp at the center of the index portion of the device. The prefocused beam of light from the light source to the photoelectric cell, which beam is directed alongside the reference line on the calibrated portion of the protractor, coincides at the start of the test with the unclamped end of the fabric sample which unsecured, hangs freely in a vertical position. The photoelectric circuit is so arranged that as long as the light beam remains uninterrupted, the electric motor or drive means does not operate. As the precreased fabric sample spontaneously recovers from its creased deformation, the free end of the fabric sample moves into the path of the light beam between the light source and the photoelectric cell. Interruption of the light beam focused on the photocell starts the electric motor which in turn rotates the transparent disc that carries the fabric sample. Rotation continues until the free end of the fabric sample has been moved out of the light path to the photoelectric cell. Once the light path has been re-established, the driving motor stops. This sequence of mechanical operations is repeated each time the fabric sample, by virtue of its spontaneous recovery from creasing deformation, moves into the light path. The photoelectric cell monitors operation of the apparatus throughout the entire testing period. The program timer is placed in the circuit for the purpose of terminating the test at the end of any desired period of time. At the convenience of the operator and at any time after the test has been completed, the operator can read the recovery angle directly from the calibrated portion of the apparatus.

Referring to FIGURE 3, the device depicted thereby is, like the apparatus of FIGURE 1, provided with a calibrated protractor 40, a photoelectric cell 41, a light source 42, a specimen holder 43 for holding the fabric sample (not shown), and a program timer 45 provided with a dial 46, this timer being a conventional one similar to that used, for example, on automatic washing machines. Not illustrated in FIGURE 3 are the transparent disc carrying the spring clip clamp, the means of supporting the disc, and the electric motor drive means, these elements, however, being included when the crease recovery tests are made as in the case of the apparatus of FIGURE 1.

FIGURE 3 depicts, primarily, a modification of FIGURE 1, this modification comprising an additional auxiliary attachment for automatically imparting an experimental crease to the fabric sample immediately prior to measurement of the crease recovery angle.

The attachment includes a motor 50, an offset crank 51 driven by the motor, and a cam 52 mounted on the crank. A weight 53 is suspended from the cam by means of a chain 54, the lower end of the chain being fixed to an arm 55 which assumes a rigid horizontal position against the fabric to be creased when the weight 53 is applied, that is, permitted to hang freely. This position is depicted in the solid line illustration of these elements in FIGURE 3. After the crease has been made in the fabric, the motor is activated causing the arm 55 to fall away from the creased fabric and to assume the position illustrated in dotted in FIGURE 3. A sensitivity adjustment control 56 for the photoelectric cell circuit and a signal light 57 to indicate that the device is in operation are also included.

The activation of the motor 50 is accomplished by turning dial 46 of the program timer to the position indicated as "Wt. Applied." Thereafter, the timer operates automatically through the "Fold" position at which time the crease is made, through the "Wt. Removed" position at which point the contact between the arm 55 and the fabric is broken, and finally, through the "Recovery" period when the creased fabric recovers from the crease, the latter being measured in substantially the same manner as that described for the apparatus of FIGURE 1.

Although the circuitry for the operation of the program timer is not shown, it is of a conventional nature and could be readily constructed by the man skilled in the art.

We claim:

A testing apparatus for measuring the crease recovery of a fabric comprising:

(a) a circular protractor mounted stationary in a vertical position and having a face calibrated to measure angular displacement in a single, vertical plane over a range of at least 180°;

(b) a photoelectric cell, having a cathode, positioned below the protractor and having its cathode vertically aligned with the center point index thereof;

(c) a light source, positioned above the protractor, for projecting a focused beam of light transverse to the calibrated face of the protractor in a path that crosses the center point index thereof, said beam being oriented at right angles to the 0°–180° base line of the protractor and aimed at the cathode of the photoelectric cell;

(d) an electric switch and accompanying circuitry operatively associated with said photoelectric cell so that said switch is in open position at such time as the path of the focused beam of light from the light source is uninterrupted and is in closed position at such time as the path of the focused beam of light is interrupted;

(e) clamping means, carrying an angle-indicating arm, for securely supporting in an angular position one end of a pre-creased, substantially rectilinear sample of textile fabric, said clamping means and angle-indicating arm being mounted for rotational movement across the calibrated face of the protractor with the axis of rotation coincident with the center point index of the protractor, the angle-indicating arm being aligned to traverse the calibrations on the face of the protractor when rotated, said clamping means being adapted to contact and hold said pre-creased fabric sample at a line immediately adjacent and parallel to the fabric crease but not superimposed thereon, the unsupported portion of the pre-creased fabric sample depending vertically away from the clamping contact adjacent and parallel to, but not interrupting, the path of the focused beam of light while the fabric is in position when initially creased, but being capable of interrupting the path of the focused beam of light at such time when the fabric sample inherently recovers from the pre-induced crease;

(f) electric motor drive means responsive to said electric switch and adapted to move said clamping means and angle-indicating arm about its axis of rotation; and (g) an automatic timing switch with contacts normally open but which are closed during the metering of time intervals in the circuit of the electric motor drive means, said automatic timing switch being adapted to stop the electric motor drive means at a preset time to terminate the test, the above-recited elements being so aligned that recovery from deformation of the creased fabric sample, as evidenced by lateral movement of its unsecured end, interrupts the focused beam of light between the light source and the cathode of the photoelectric cell, actuating the electric switch which, in turn, actuates the electric motor drive means to move the clamping means and angle-indicating arm about the axis of rotation to reposition the angle-indicating arm relative to the protractor calibrations, and to move the unsecured end of the creased fabric sample out of the focused beam of light thereby reestablishing the photoelectric cell circuit and opening the electric switch circuit to stop the electric motor drive means, this repetitive operation continuing with cumulative angular measurement of the inherent recovery of the creased fabric sample until termination of the test.

References Cited in the file of this patent

UNITED STATES PATENTS 1,791,288    Schweitzer _____ Feb. 3, 1931

OTHER REFERENCES

Article: "Evaluation of the Wrinkle Recovery of Fabrics by Means of the Wrinkle Recovery Tester," published by the Technical Manual of the American Association of Textile Chemists and Colorists, volume 35 (1959).